United States Patent [19]
Johnson et al.

[11] Patent Number: 5,535,061
[45] Date of Patent: Jul. 9, 1996

[54] ROTARY SCANNER

[75] Inventors: Michael G. Johnson, Chanhassen, Minn.; George L. Lemasa, Brockton, Mass.

[73] Assignee: Juno Enterprises, Inc., Minneapolis, Minn.

[21] Appl. No.: 186,006

[22] Filed: Jan. 24, 1994

[51] Int. Cl.$^6$ .......................... G02B 7/182; G02B 26/08; G03B 21/26

[52] U.S. Cl. .......................... 359/872; 359/876; 359/201; 353/36; 353/66

[58] Field of Search .................................. 359/872, 876, 359/889, 197, 198, 200, 201, 202, 203, 205, 210, 212, 215; 348/94; 360/1, 87

[56] References Cited

U.S. PATENT DOCUMENTS

| | | | |
|---|---|---|---|
| 4,024,518 | 5/1977 | Boston | 340/206 |
| 5,078,463 | 1/1992 | Kawawada | 359/201 |
| 5,355,234 | 10/1994 | Kim | 359/889 |

OTHER PUBLICATIONS

Specification Sheet, Scanmaster D4000, Professional Drum Scanner.

*Primary Examiner*—Paul M. Dzierzynski
*Assistant Examiner*—Mohammad Y. Sikder
*Attorney, Agent, or Firm*—Kinney & Lange

[57] ABSTRACT

An apparatus positions a rotary drum having an axis of rotation in an image scanner having a frame to position an image source mounted on the rotary drum. A way is mounted to the frame. A headstock and a tailstock are disposed and arranged to receive and support the rotary drum and are independently mounted on the way for lineal movement along the axis of the drum. A drum drive device rotates the drum about the axis and a headstock drive device linearly moves the headstock along the axis in first and second opposite directions. A stop block is supported by the frame and impedes a linear movement of the tailstock in the second direction at a selected stop position. A connector connects the headstock to the tailstock to cause the tailstock to move linearly along the axis in response to the movement of the headstock and includes a disengaging mechanism to disengage the tailstock from the headstock when the tailstock is at the selected stop position to permit the headstock to continue to move in the second direction.

21 Claims, 7 Drawing Sheets

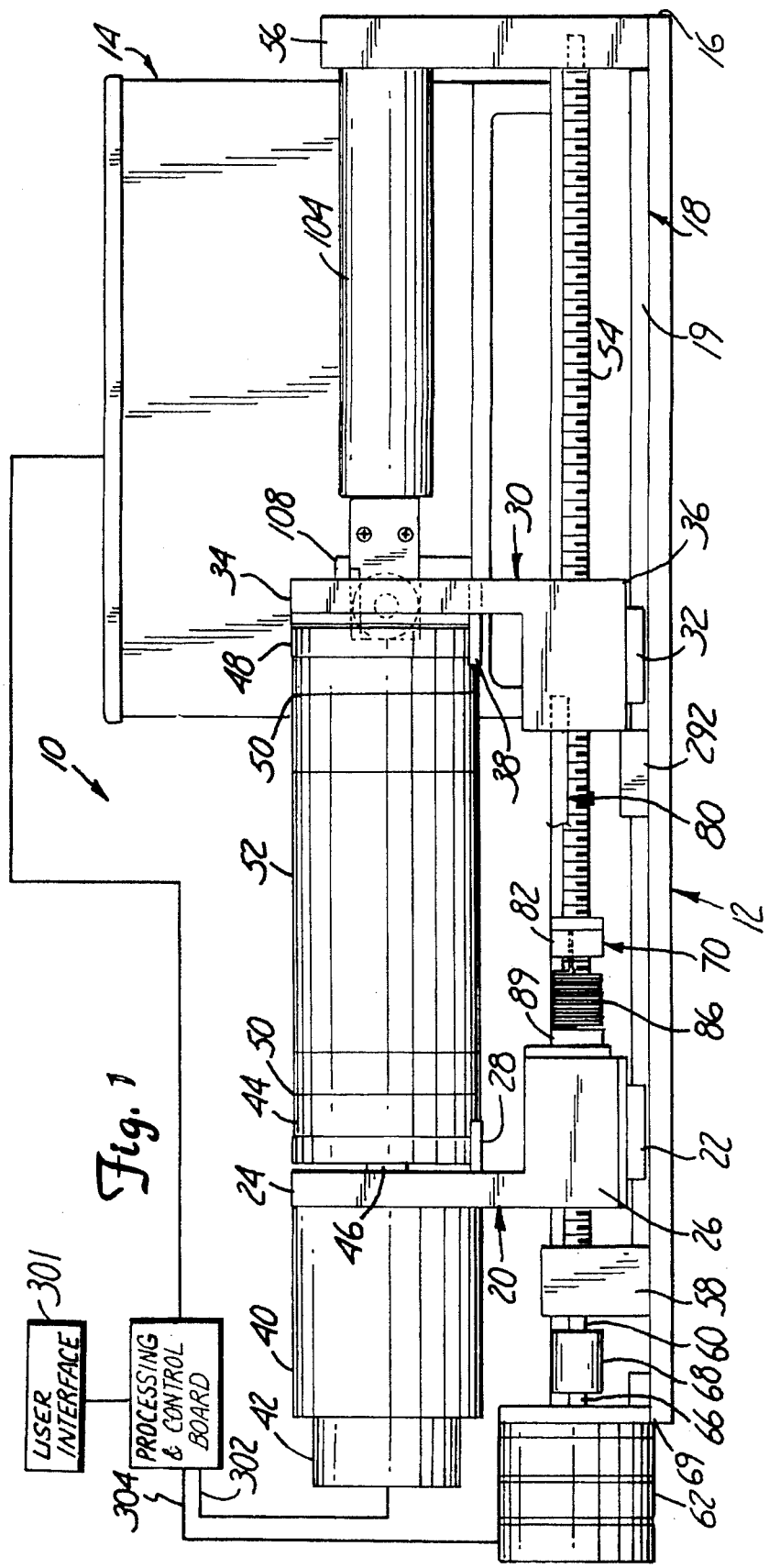

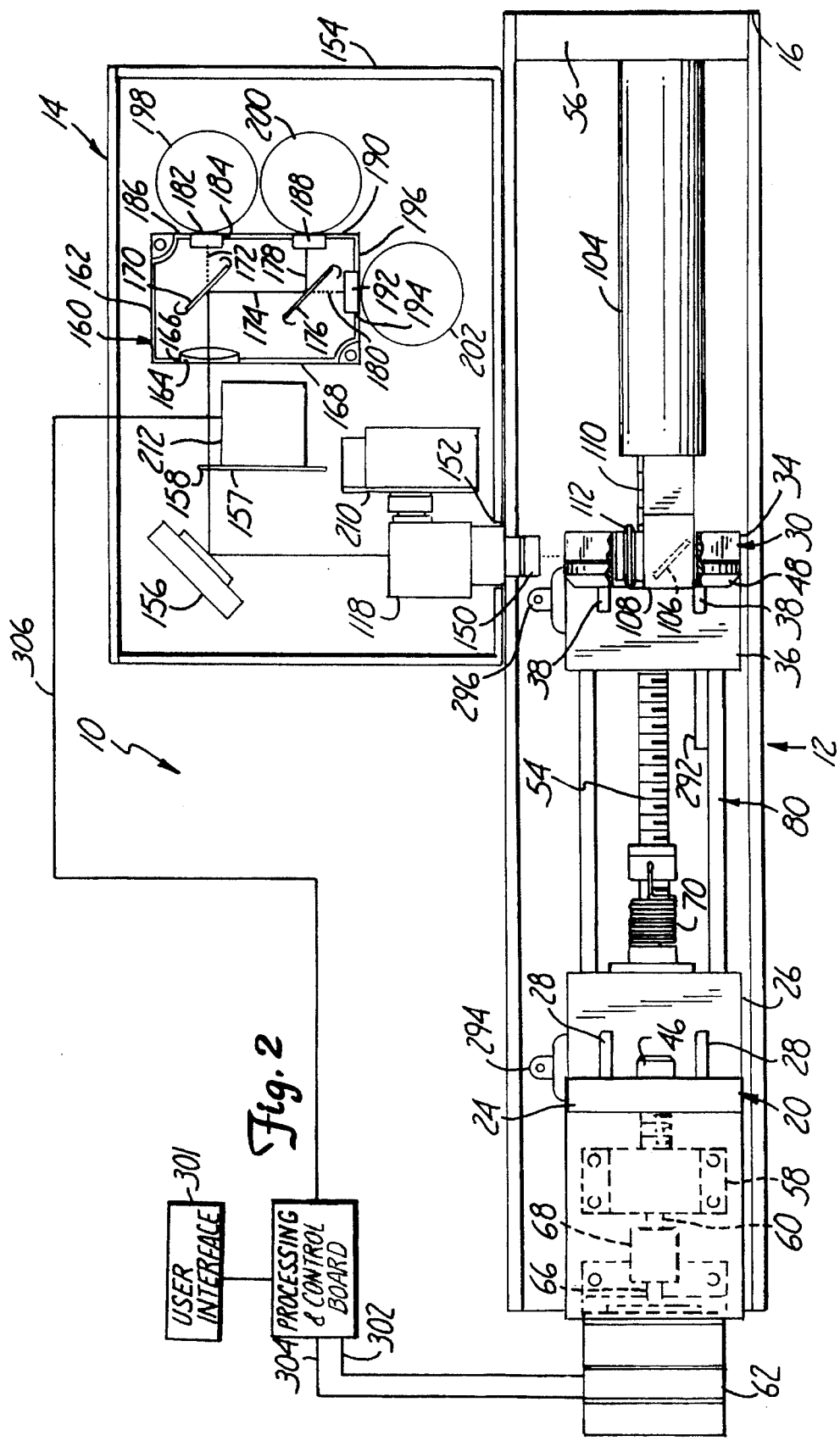

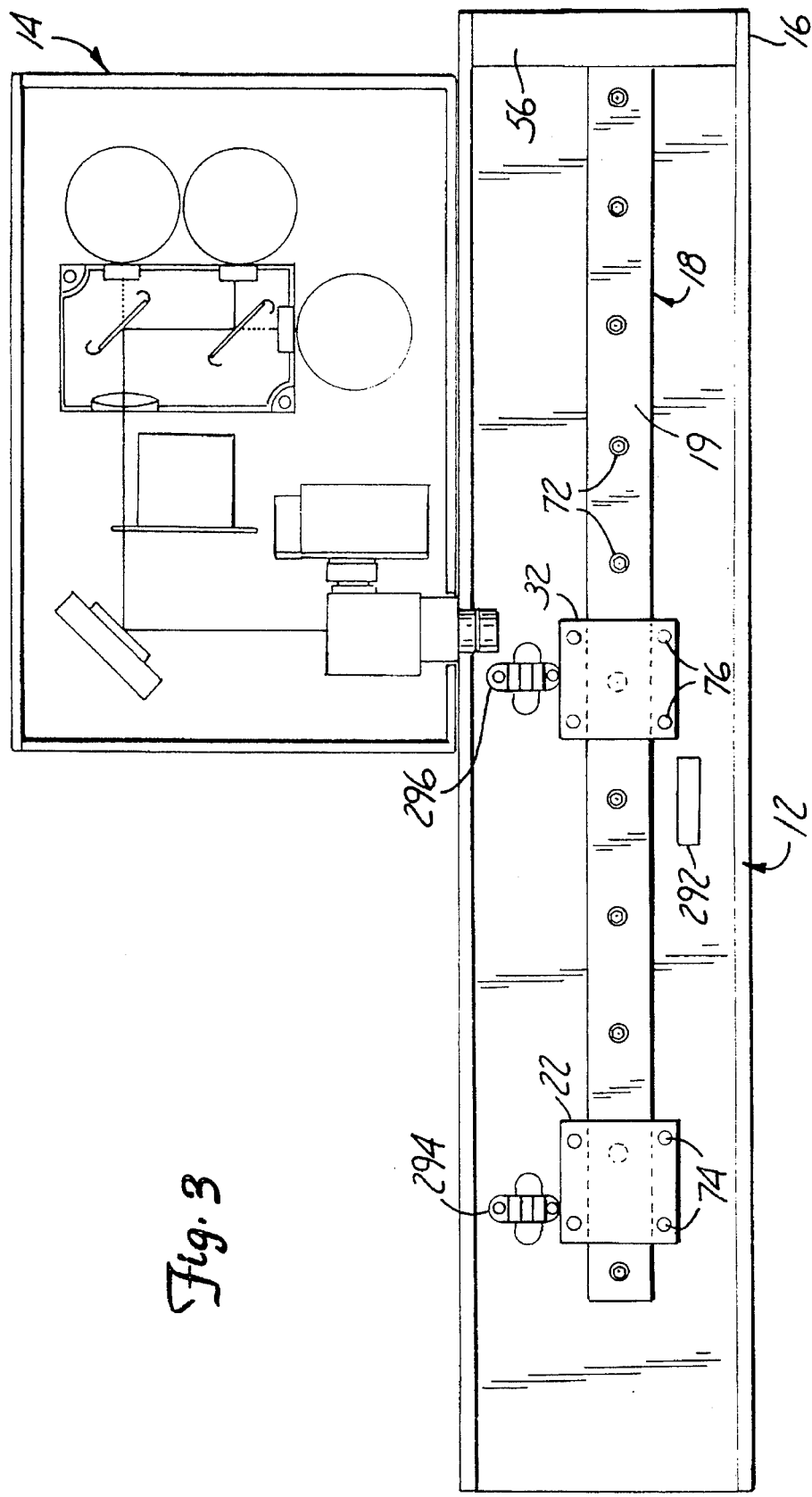

ROTARY SCANNER

BACKGROUND OF THE INVENTION

The present invention relates generally to image scanners for providing a digitized image of a document, and in particular, to a rotary drum scanner for providing a digitized image from a transparent or reflective document.

Image scanners are utilized for digitizing both text and image sources. The image sources scanned include conventional documents such as letters, memoranda, photographs, transparencies, and the like. The two principle types of image scanners are flat bed scanners and rotary scanners. Flat bed scanners are constructed so that the image source is mountable on a flat surface or "bed." The image source is scanned from side to side and line by line and then processed into a desired digital image which is in a form suitable for high-speed processing. A problem with using flat-bed scanners is the complexity of the scanner which requires careful adjustment in order to maintain image quality. In addition, the resolution and the dynamic range of the digital image is limited because of the nature of the linear array used for scanning the image. Consequently, flat-bed image scanners are used in applications which do not require a high resolution or a wide dynamic range because flat-bed scanners have traditionally been priced at the low end of the image scanner price range.

A rotary scanner utilizes a rotary drum to mount the image source. The rotary scanner rotates the drum and linearly positions the drum to permit a light source to illuminate portions of the image source. An optical processing unit of the image scanner contains a scanning device which scans the illuminated portions of the image to form the digitized image. Both the light source and the scanning device are fixed in position and the rotary drum is moved linearly and rotated relative to the light source and the scanning device. Because the relative motion between the drum and the scanning device is primarily rotational in nature, high scanning rates can be achieved. The high scanning rates produce digital images with high resolutions and increase dynamic ranges. Thus, rotary scanners are typically used in commercial operations. Nevertheless, the nature of the rotary scanner has typically made it more expensive than flat-bed scanners. Thus, there is desire for a rotary scanner which provides high quality resolution and broad dynamic range at a lower cost than existing rotary scanners.

One problem associated with rotary scanners is that removing the drum to place a new image source on the drum has traditionally required complex alignment procedures. A quick release mechanism eases the removal of the drum. The Boston U.S. Pat. No. 4,024,518 discloses a rotary image scanner which includes such a quick release mechanism. The Boston patent mounts the drum between a headstock assembly and a tailstock assembly. The tailstock assembly is movably mounted on a carrier rail for axial movement towards the headstock assembly. The tailstock assembly has a spring loaded, conically tapered moving center element corresponding to a conical taper on the drum. Axial movement of the tailstock assembly is controlled by an actuator assembly where a handle of the actuator assembly is moved in a direction to move the tailstock assembly in an axial direction towards the headstock assembly. The moveable center element of the tailstock engages the left-hand conical drum aperture and moves the drum to the right until the right-hand tapered drum aperture is seated on the drum spindle. In this way, the drum is actually aligned with a rotational axis of the drive spindle.

Another type of quick release mechanism is used in the Howtek, Inc. Scan Master D4000 image scanner. Again, the drum is mounted between a headstock and a tailstock. However, unlike the Boston patent, the headstock and tailstock are fixedly mounted to a first carriage and a second carriage respectfully. The first carriage is fixedly mounted on a base, and the second carriage is movably mounted on the base. The Howtek Scanner includes an arm mounted on one of the carriages and rotatable to force the carriages apart, which allows the drum to be inserted when the arm is in the open position to force the carriages apart. In addition, a spring inner-connects the carriages to bias the carriages towards each other when the arm is in the closed position so that the drum is secured between the headstock and the tailstock.

SUMMARY OF THE INVENTION

The present invention relates to a first apparatus for positioning a rotary drum having an axis of rotation in an image scanner having a frame to position an image source mounted on the rotary drum so that a light source illuminates a selected portion of the image and to enable an analyzing device to analyze the selected portion of the image source. The apparatus includes a way mounted to the frame. A headstock is disposed and arranged to receive and support a first end of the rotary drum. A tailstock is disposed and arranged to receive and support a second end of the rotary drum. The headstock and tailstock are independently mounted on the way for linear movement along the axis of the drum. Drum drive means rotates the drum about the axis. Headstock drive means linearly moves the headstock along the axis in first and second opposite directions. A stop block is supported by the frame and impedes a linear movement of the tailstock in the second direction at a selected stop position. A connector connects the headstock to the tailstock to cause the tailstock to move linearly along the axis in response to the movement of the headstock. The connector includes a disengaging mechanism to disengage the tailstock from the headstock when the tailstock is at the selected stop position to permit the headstock to continue to move in the second direction.

A second form of the invention relates to a second apparatus for sensing and processing image source signals from an image source mounted on a rotary drum of an image scanner and illuminated by a light source. This second apparatus includes a receiver lens for receiving and focusing light representative of the image source. An aperture receives and projects the light focused by the receiver lens. The second apparatus includes a substantially opaque housing. A condenser lens is mounted in a wall of the housing and receives and projects light transmitted through the aperture. A light splitter is disposed inside the housing and splits the light projected by the condenser lens into a plurality of light beams. A plurality of light filters are disposed in the housing for filtering selected portions of the light spectrum from the plurality of light beams. A plurality of photo-multiplier tubes corresponding to the plurality of light filters receive the plurality of light beams filtered by the light filters. Each photo-multiplier tube provides a voltage level based on the intensity of the incident filtered light beam.

In a preferred embodiment of the first apparatus according to the present invention, the connector includes a connecting rod having a first end fixedly mounted to the tailstock. A retaining ring is supported by the connecting rod. The connector also includes a spring having a first end bearing against the retaining ring. A second end of the spring bears against the headstock to retain the drum between the headstock and the tailstock. The spring reacts against a force applied in the second direction of linear movement of the headstock when the tailstock is in the stop position to permit continued movement of the headstock in the second direction to release the drum from between the headstock and the tailstock.

The headstock drive means of the first apparatus according to the present invention preferably includes a lead screw and a nut mechanism which is fixedly attached to the headstock. The nut mechanism is threadably attached to the lead screw. A motor rotates the lead screw to cause the nut mechanism to move linearly along the lead screw which causes the headstock to move linearly in the first and second opposite directions. In addition, the drum drive means preferably includes a motor. A home sensing switch preferably operates to turn off the drum motor and the lead screw motor when the headstock reaches a preset stop position.

A preferred embodiment of the second apparatus according to the present invention includes a rotary wheel having a plurality of apertures circumferentially arranged on the rotary wheel. The rotary wheel is operable to select one of the plurality of apertures through which light is received and projected. The plurality of apertures are preferably rectangular-shaped apertures. The rotary wheel can be controlled manually by an operator to select a desired aperture. Alternatively, the rotary wheel is automatically controlled by a computer to select a desired aperture.

The preferred embodiment of the second apparatus according to the present invention preferably includes a red filter, a blue filter, and a green filter. A first photo-multiplier tube receives light filtered by the red filter. A second photo-multiplier tube receives light from the blue filter. A third photo-multiplier tube receives light from the green filter. A first light splitter preferably splits the light transmitted through the aperture into a first light beam and a second light beam. A second light splitter preferably splits the second light beam into a third light beam and a fourth light beam. The first light beam preferably comprises substantially red spectral components and is projected to the red filter. The third light beam preferably comprises substantially blue spectral components and is projected to the blue filter. The fourth light beam preferably comprises substantially green spectral components and is projected to the green filter.

BRIEF DESCRIPTION OF THE DRAWINGS

FIG. 1 is a schematic elevational view of a image scanner according to the present invention;

FIG. 2 is a schematic top plum view of the image scanner according to the present invention;

FIG. 3 is a schematic top plan view of the image scanner according to the present invention showing features of the image scanner not shown in FIG. 2;

DETAILED DESCRIPTION OF THE PREFERRED EMBODIMENTS

Figure 4A:
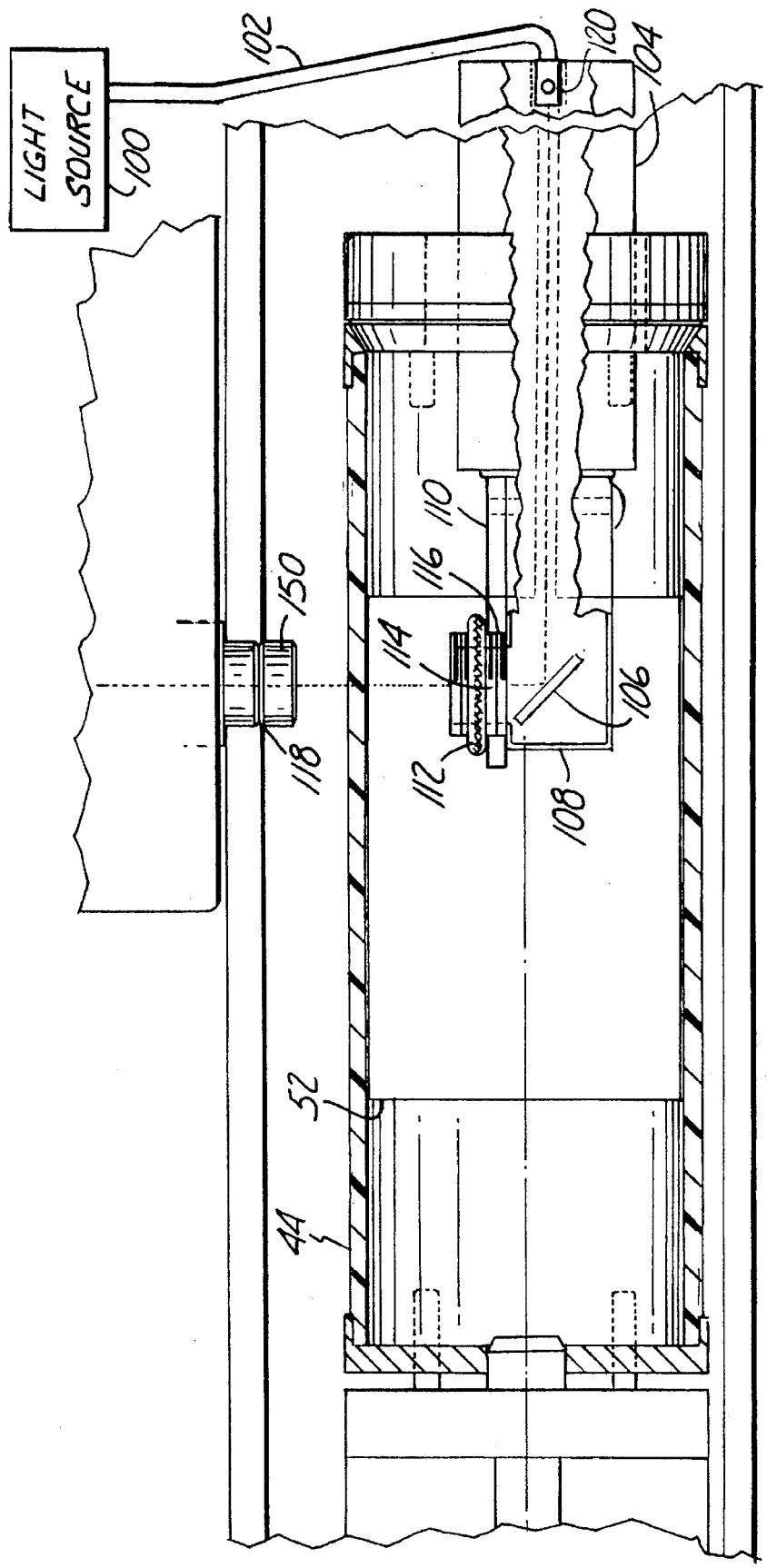
FIG. 4A is an enlarged fragmentary detailed view of a portion of the image scanner according to the present invention as configured to scan transmissive images.

A rotary image scanner according to the present invention in generally illustrated at 10, in FIGS. 1 and 2. The rotary scanner 10 scans an image source and provides voltage values representative of the image source to a digital signal processor which provides a digitized image having a high resolution and wide dynamic range. Rotary scanner 10 is substantially less expensive than existing rotary scanners that provide comparable resolutions and dynamic ranges. Like reference characters will be used for like elements throughout the drawings.

Referring to FIGS. 1 and 2, the rotary scanner 10 comprises a drum mounting and positioning portion 12 and an optical bench portion 14. The drum mounting and positioning portion 12 includes a supporting frame 16. A linear way 18 is fixedly mounted on frame 16. Linear way 18 is a commercially available part which comprises a track rail 19, a slide unit 22 and a slide unit 32. Slide units 22 and 32 are independently movably mounted on track rail 19. A headstock 20 is mounted on slide unit 22. Since slide unit 22 is movably mounted on linear way 18, headstock 20 rides on linear way 18. Headstock 20 includes a drive plate portion 24 and a drive base portion 26 to form an L-shaped headstock. Drive base portion 26 of headstock 20 is fixedly mounted to slide unit 22. An L-shaped tailstock 30 is fixedly mounted on slide unit 32 which is movably mounted on linear way 18 such that the L-shaped headstock 20 and the L-shaped tailstock 30 face inwardly towards each other with the tailstock being disposed on the linear way to the right of the headstock when viewing the image scanner from the front. The tailstock includes an end plate portion 34 and an end base portion 36. The end base portion 36 of tailstock 30 is fixedly mounted to the slide unit 32. Two support posts 28 are fixedly attached into the lower portion of the drive plate 24 of headstock 20 to face inwardly towards the tailstock. Likewise, two support posts 38 are fixedly attached into the lower portion of end plate 34 of tailstock 30 to face inwardly towards headstock 20.

As illustrated in detail in FIG. 3, track rail 19 is mounted on frame 16 with screws 72. Headstock 20 is mounted to slide unit 22 of linear way 18 with four screws 74 and tailstock 30 is mounted to slide unit 32 of linear way 18 with four screws 76.

Referring back to FIGS. 1 and 2, a drum drive motor 40 is mounted into drive plate 24 of headstock 20. Art encoder 42 is attached to drum drive motor 40. When the rotary scanner 10 is operating to scan an image, a rotary drum 44 is seated between a tapered shaft 46 of motor 40 and a tapered receiving portion 48 of tailstock 30. Drum 44 includes scribe lines 50 indicating the outer boundaries of a selected inner portion of the drum. An image source 52 is mountable between scribe lines 50. Thus, when properly energized, drum drive motor 40 rotates drum 44 which rotates image source 52.

The mounting and positioning portion 12 of image scanner 10 also includes a lead screw 54. Lead screw 54 is a commercially available part which comprises a nut mechanism 70. Nut mechanism 70 is threadably coupled around lead screw 54 and fixedly attached to drive base portion 26 of headstock 20 such that a rotation of lead screw 54 drives nut mechanism 70 longitudinally along the lead screw which causes headstock 20 to ride linearly to the right or left along way 18. Lead screw 54 is mounted between a right side wall 56 of frame 16 and a bracket 58. Bracket 58 is fixedly mounted to frame 16 at the left end of the image scanner. A left end portion of the lead screw runs through the left side of bracket 58. A lead screw drive motor 62 is mounted on the left end of frame 16 on a mounting bracket 64. A drive shaft 66 of motor 62 is coupled to the left end portion of screw 54 with a mechanical coupler 68 to allow the lead screw drive motor 62 to rotate lead screw 54 counterclockwise and clockwise to move headstock 20 linearly along linear way 18.

Figure 5:
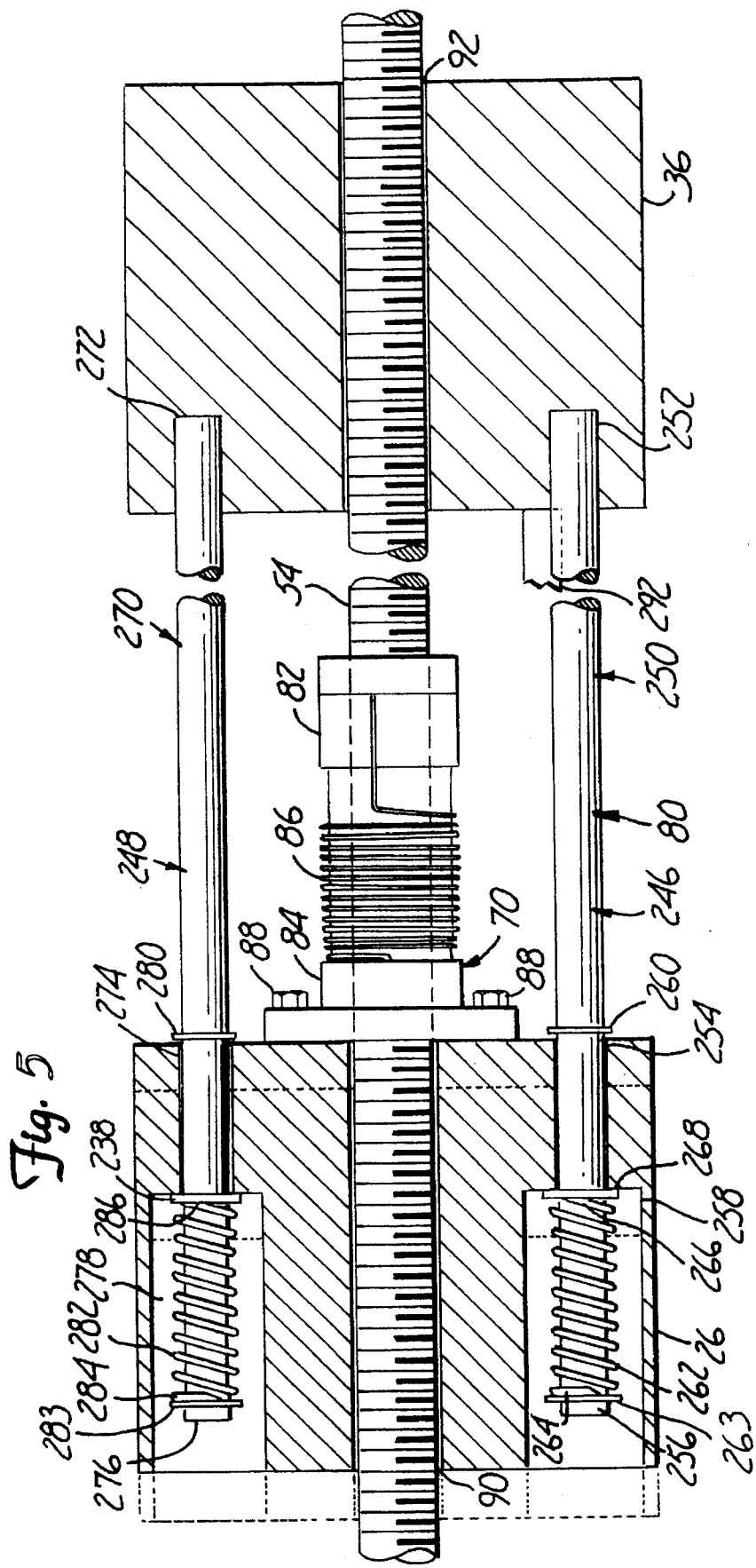
FIG. 5 is an enlarged fragmentary detailed view of a portion of the image scanner according to the present invention.

A more detailed view of the connection of drive base portion 26 of headstock 20 to nut mechanism 70 of lead screw 54 is illustrated in FIG. 5. Nut mechanism 70 comprises a right nut end 82 and a left nut end 84 which are threadably coupled around lead screw 54. An anti-back lash spring 86 has a first end connected to nut end 82 and a second end connected to nut end 84 to bias the nut end 84 and nut end 82 away from each other. By splitting the nut area in this way, end play in lead screw 54 is substantially eliminated. Nut end 84 is bolted to drive base 26 of headstock 20 with bolts 88. Lead screw 54 passes through a rectangular opening 90 in drive base 26 of headstock 20 and a rectangular opening 92 in end base 36 of tailstock 30. Headstock 20 linearly moves substantially parallel to the rotational axis of drum 44 along linear way 18 as nut mechanism 70 is driven longitudinally along lead screw 54.

A connecting mechanism 80 connects tailstock 30 to headstock 20. Connecting mechanism 80 causes tailstock 30 to move linearly along way 18 in response to movement of the headstock caused by the rotation of lead screw 54. A more detailed discussion of the features of connection mechanism 80 are discussed below in reference to FIG. 5. Thus, when image scanner 10 is scanning image 52, drum drive motor 40 rotates drum 44 and lead screw drive motor 62 rotates lead screw 54 to cause headstock 20 to move linearly to the right and left along linear way 18 which causes tailstock 30 to move correspondingly to the left or right depending on the rotation direction of lead screw 54. This linear movement of headstock 20 and tailstock 30 along linear way 18 is in a line substantially parallel to the rotational axis of rotary drum 44. Because drum 44 is seated between headstock 20 and tailstock 30, drum 44 is driven longitudinally along a line substantially parallel to the rotational axis of the drum.

Referring to FIG. 4A, a light source or a lamp 100 provides a high intensity beam for illuminating portions of image source 52 on the drum 44. The light from light source 100 travels through a fiber optic cable 102. A tube 104 is attached to frame wall 56 (see FIG. 2) and extends inwardly from wall 56. Fiber optic cable 102 is mounted to tube 104 with a set screw. A plate 108 fits inside of tube 104 and is held with two nylon tipped set screws. A mirror 106 receives the light transmitted by fiber optic cable 102. Mirror 106 is mounted to plate 108. Mirror 106 is positioned at a 45° angle to the path of light provided by fiber optic cable 102. A lens plate 110 is attached to and extends inwardly from plate 108. A source lens 112 has a threaded portion 114 which threads into a threaded opening 116 of lens plate 110. Mirror 106 receives and reflects the light from fiber optic cable 102 through the source lens 112. Source lens 112 receives the light reflected by mirror 106 and projects the light through transparency image source 52 to a receiving lens 150. Receiving lens 150 is contained in optical bench 14 which is discussed below. In this way, light source 100, fiber optic cable 102, mirror 106, and source lens, 112 provide a light source to illuminate the portion of image 52 which is rotated and longitudinally positioned into the path of the light projected by source lens 112. Receiving lens 150 receives the light transmitted through transparency image source 52 to permit optical bench 14 to analyze the image. A scrambler rod 120 is attached to the end of fiber optic cable 102 to provide relatively uniform distribution of light over the end face of fiber optic cable 102. In this way, scrambler rod 120 avoids excessive hot spots.

Figure 4B:
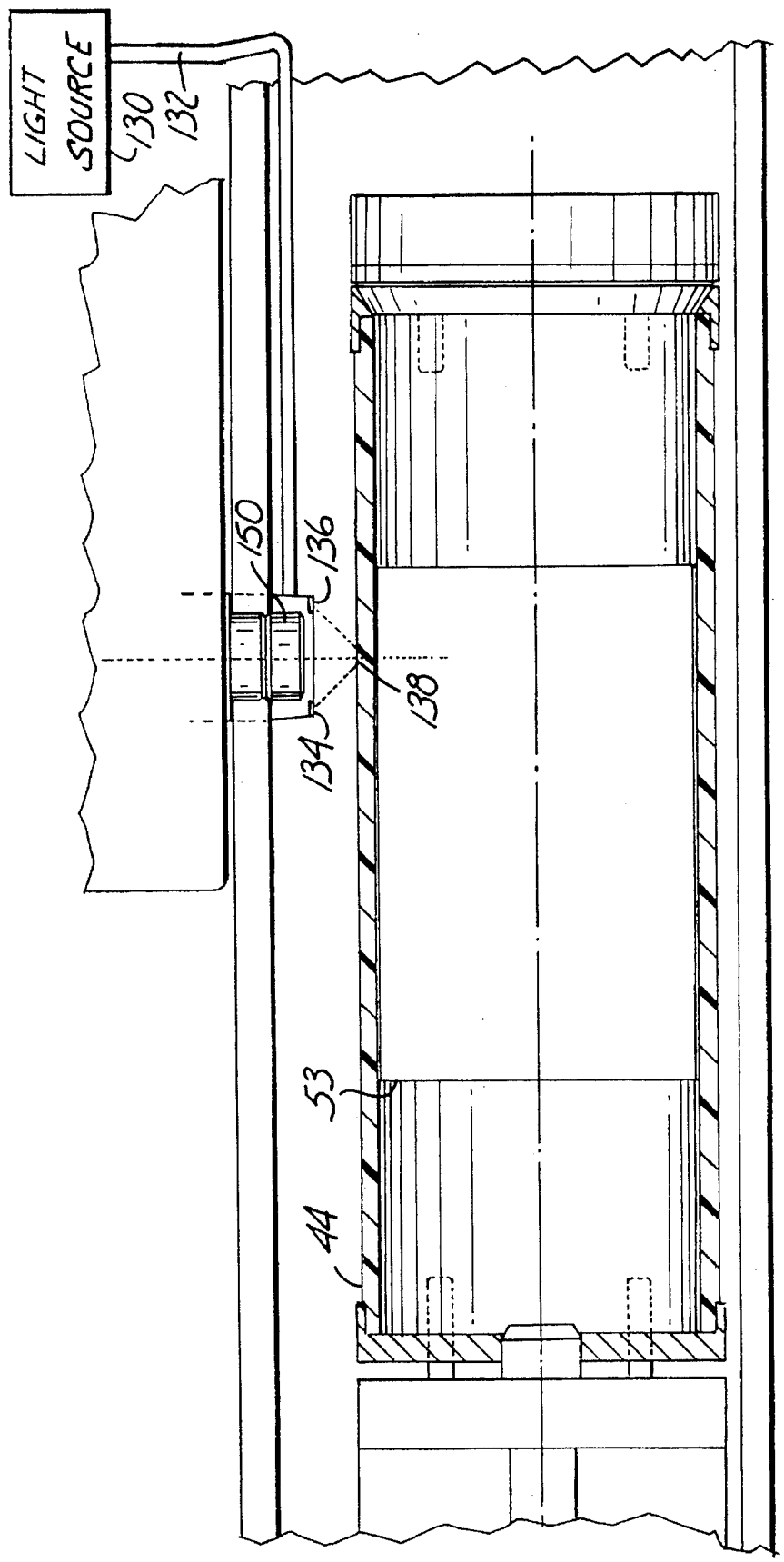
FIG. 4B is an enlarged fragmentary detailed view of a portion of the image scanner according to the present invention as configured to scan reflective images.

The above description of the present invention with reference to FIG. 4A describes and illustrates a rotary drum scanner configured to scan a transparent image source 52. A reflective image is also easily scanned by image scanner 10. A reflective configuration of image scanner 10 is illustrated in FIG. 4B. A light source 130 provides a high intensity beam for illuminating portions of a reflective image source 53 mounted on the drum 44. The light from light source 130 travels through a fiber optic cable 132 which feeds light into an illuminating ring 134. Illuminating ring 134 encloses several illuminating lenses 136 which project the light from fiber optic cable 132 at a 45° angle to the lens axis onto a spot 138 on reflective image 53, which reflects the light to receiver lens 150. Thus, in the reflective configuration, light illuminates the outside of drum 44 instead of the inside of drum 44 to allow light to be reflected off reflective image 53 to the receiver lens 150.

In reference to FIG. 2, optical bench 14 comprises receiver lens 150 to receive the light transmitted through transparent image source 52 or reflected off of reflective image source 53. Receiver lens 150 extends through an opening 152 of a housing 154 of optical bench 14 and threads into a bracket 118. Receiver lens 150 focuses light transmitted through transparent image source 52 or reflected from reflective image source 53 to a directing mirror 156. Directing mirror 156 receives and reflects the light focused by receiver lens 150 to an aperture wheel 157 and through a selectable aperture 158 which is disposed in the aperture wheel. The light transmitted through aperture 158 is received by an optical block 160.

Optical block 160 comprises a substantially opaque housing 162. A condenser lens 164 is mounted in an opening 166 disposed in a side wall 168 of opaque housing 162. Condenser lens 164 receives and projects the light transmitted through aperture 158. A light splitter 170 is mounted inside of opaque housing 162 to receive the light projected by condenser lens 164. Light splitter 170 splits the light projected by condenser lens 164 into a light beam 172 and a light beam 174. A light splitter 176 splits light beam 174 into a light beam 178 and a light beam 180. A red filter 182 receives light beam 172 and filters selected portions of the light spectrum from light beam 172 to provide red light. Red filter 182 is mounted in an opening 184 disposed in a right side wall 186 of opaque housing 162. A blue filter 188 receives light beam 178 and filters selected portions of the light spectrum from light beam 178 to provide blue light. Blue filter 188 is mounted in an opening 190 disposed in right side wall 186. A green filter 192 receives light beam 180 and filters selected portions of the light spectrum from light beam 180 to provide green light. Green filter 192 is mounted in an opening 194 disposed in a front wall 196 of opaque housing 162.

Light splitter 170 operates by transmitting the red spectral components of light received from condenser lens 164 and reflecting the remaining spectral components from the light from condenser lens 164. Thus, red filter 182 receives substantially red spectral components of light. Light splitter 176 operates by transmitting the green spectral components of light from light beam 174 and reflecting the remaining spectral components from light beam 174 which substantially comprise blue spectral components. Thus, blue filter 188 receives substantially blue light components from light beam 178. Green filter 192 receives substantially green spectral components of light from light beam 180.

A photo-multiplier tube 198 receives the red light filtered by red filter 182. A photo-multiplier tube 200 receives the blue light from blue filter 188. A photo-multiplier tube 202 receives the green light filtered by green filter 194. The photo-multiplier tubes 198, 200, and 202 provide respective voltage levels indicating the relative intensity of the red, blue, and green light that has been transmitted from the selected portion of image 52 or image 53 which is illuminated during one illumination interval by the light source. The voltage levels provided by the photo-multiplier tubes are provided to processing and control board 300. The processing and control board 300 processes the voltage levels provided by photo-multiplier tubes 198, 200, and 202 to provide a digitized image of the image source.

The opaque housing of optical box 160 substantially eliminates light noise in the red, blue, and green light provided to photo-multiplier tubes 198, 200, and 202. Previous designs of image scanners did not enclose the condenser lens, the light splitters, and the light filters in an optical box such as optical box 160. The opaque housing 162, substantially eliminates light noise which allows the design of the image scanner to be accomplished at a reduced price and still provide the same resolution and dynamic range in the resulting digitized image provided by the image scanner. The opaque housing 162 is preferably made from an extruded and molded plastic such as an acetal. Such an acetal is provided by EI Dupont under the commercial name of Delrin. The Delrin should be black or any substantially opaque color so the outside light will not produce light noise into the light provided to the photo-multiplier tubes. In this way, photo-multiplier tube 198 provides an accurate voltage level indicating the intensity of red light that has been transmitted from the selected portion of image 52 or image 53 which is illuminated during one illumination interval. Correspondingly, photo-multiplier tube 200 provides an accurate voltage level indicating the intensity of blue light transmitted during this same illumination interval and photo-multiplier tube 202 provides an accurate voltage level indicating the intensity of green light transmitted from the image source during the same illumination interval.

An auto-focusing mechanism 210 is attached to receiving lens 150. Auto-focusing mechanism 210 translates lens 150 toward or away from drum 44 to thereby change the focal position of lens 150. Auto-focus mechanism 210 is a standard motorized auto-focusing mechanism.

Aperture wheel 157 has a series of apertures 158 which are selectably brought into the path of the light reflected by directing mirror 156. Apertures 158 define the size of the image that is passed to the optical block 160. The size of the image being passed to optical block 160 defines the resolution of the image. A motor 212 selectively positions the appropriate aperture 158 into the light reflected by mirror 156.

Figure 6:
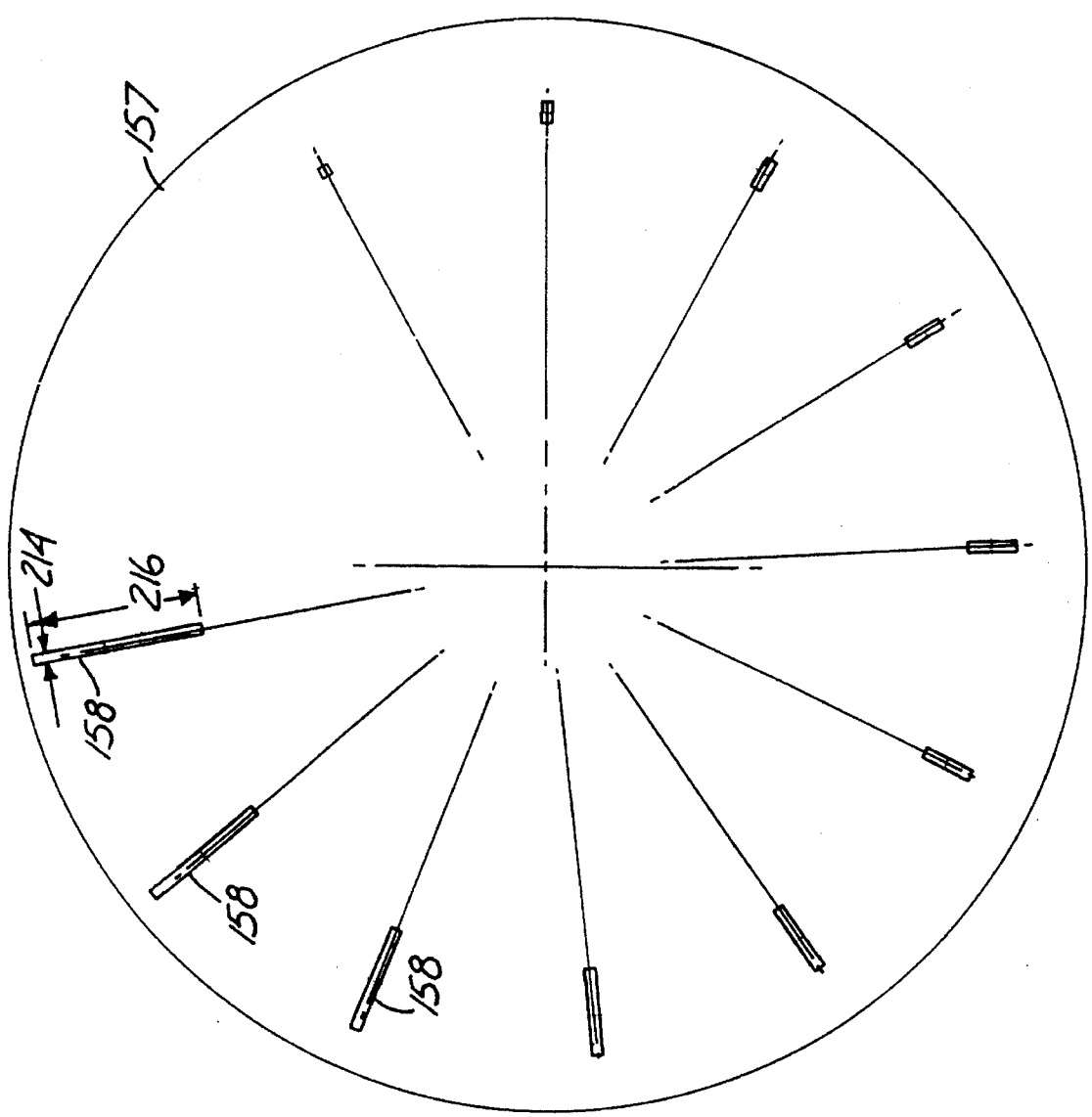
FIG. 6 is a schematic view of a rotary wheel having rectangular-shaped apertures circumferentially arranged on the rotary wheel for use in the image scanner according to the present invention.

FIG. 6 illustrates the disposition of the apertures 158 circumferentially arranged on the aperture wheel 157. As illustrated, apertures 158 are rectangular-shaped apertures. The width of the rectangular apertures is indicated by arrows 214 at the longest aperture. In the preferred embodiment illustrated in FIG. 6, the apertures are all a width of 0.0025 inches, but the apertures vary in length. As indicated by arrows 216, the longest aperture is 0.05 inches. Apertures decrease in size in the counter-clockwise direction on wheel 157. Lengths of the apertures in this embodiment are as follows from the shortest to the longest aperture length:

Apertures with a tolerance of ±0.001 inches
0.0500 inches
0.0400 inches
0.0300 inches
0.0250 inches
0.0200 inches
0.0150 inches
Apertures with tolerances of ±0.0005 inches
0.0125 inches
0.0100 inches
0.0075 inches
0.0050 inches
0.0025 inches With these varying aperture lengths and with a variation of the rotation of drum 44, resolutions are provided varying from 4000 DPI when the shortest aperture of 0.0025×0.0025 inches is selected to 200 DPI when the longest aperture of 0.05×0.0025 inches is selected.

Drum drive motor 40 typically operates in range from approximately 355 RPM to approximately 1745 RPM. Lead screw drive motor 62 drives the headstock and tailstock in increments as small as 0.00025 inches. A 6 inch×6 inch image 52 is scanned in approximately 1.38 minutes at a resolution of 400 DPI. Accordingly, as the resolution gets higher, the scanning time increases such that an 6×6 inch image is scanned in approximately 4.23 minutes at 1000 DPI. Similarly, as the resolution decreases, the scan time also decreases.

The rectangular apertures illustrated in FIG. 6 provide a convolution of the input image. In previous image scanners, the apertures were designed to have a symmetrical shape, such as a circular or square shape, as compared to the rectangular ones in the present invention. Symmetrical apertures average the input signal more than the rectangular apertures of the present invention which tends to minimize the noise but blurs the image. The rectangular apertures of the present invention do not tend to blur the image and provide a closer representation of the input light signal.

FIG. 5 illustrates in detail connecting mechanism 80. Connecting mechanism 80 includes a front connecting mechanism 246 and a rear connecting mechanism 248 which are substantially similar. Front connecting mechanism 246 comprises a front connecting rod 250 having an end 252 fixedly mounted into end base portion 36 of tailstock 30. Connecting rod 250 passes through a cylindrical opening 254 of drive base portion 26 of headstock 20. Cylindrical opening 254 has a diameter slightly larger than the diameter of connecting rod 250 to enable connecting rod 250 to freely move through opening 254. A left end 256 of connecting rod 250 is disposed in a cylindrical opening 258 of drive base portion 26 of headstock 20. Cylindrical opening 258 has a diameter substantially larger than the diameter of cylindrical opening 254. A retaining ring 260 fits into a groove of connecting rod 250 adjacent to the right side of opening 254. Retaining ring 260 has a diameter larger than the diameter of opening 254 so that the movement of tailstock 30 relative to headstock 20 is limited when drum 44 is not installed in the image scanner. A spring 262 has a left end 264 pressing against a retaining ring 263 which fits into a groove of connecting rod 250 adjacent to end 256 of the connecting rod. Spring 262 has a right end 266 pressing against a washer or bushing 268. Washer 268 has an outer diameter which is larger than the diameter of opening 254 and an inner diameter slightly larger than the diameter of connecting rod 250 so that when headstock 20 is driven linearly to the left along way 18, a force is applied to washer 268 to compress spring 262. When connecting mechanism 80 is assembled, spring 262 is compressed between retaining ring 263 and washer 268. When drum 44 is installed between headstock 20 and tailstock 30, spring 262 is further compressed to retain drum 44.

Rear connecting mechanism 248 comprises a rear connecting rod 270 having an end 272 fixedly mounted into end base portion 36 of tailstock 30. Connecting rod 270 passes through a cylindrical opening 274 of drive base portion 26 of headstock 20. Cylindrical opening 274 has a diameter slightly larger than the diameter of connecting rod 270 to enable connecting rod 270 to freely move through opening 274. A left end 276 of connecting rod 270 is disposed in a cylindrical opening 278 of drive base portion 26 of headstock 20. Cylindrical opening 278 has a diameter substantially larger than the diameter of cylindrical opening 274. A retaining ring 280 fits into a groove of connecting rod 270 adjacent to the right side of opening 274. Retaining ring 280 has a diameter larger than the diameter of opening 274 so that the movement of tailstock 30 relative to headstock 20 is limited when drum 44 is not installed in the image scanner. A spring 282 has a left end 284 pressing against a retaining ring 283 which fits into a groove of connecting rod 270 adjacent to end 276 of the connecting rod. Spring 282 has a right end 286 pressing against a washer or bushing 288. Washer 288 has an outer diameter which is larger than the diameter of opening 274 and an inner diameter slightly larger than the diameter of connecting rod 270 so that when headstock 20 is driven linearly to the left along way 18, a force is applied to washer 288 to compress spring 282. When connecting mechanism 80 is assembled spring 282 is compressed between retaining ring 283 and washer 288. When drum 44 is installed between headstock 120 and tailstock 30, spring 282 is further compressed to retain drum 44.

Thus, front connecting mechanism 246 and rear connecting mechanism 248 work in conjunction to retain drum 44 and to transfer the force from headstock 20 to tailstock 30 to drive tailstock 30 to the right as headstock 20 moves to the right linearly along linear way 18. As headstock 20 is driven linearly to the left, tailstock 30 is also pulled linearly to the left because the tensions of springs 262 and 282 are such that the springs do not substantially compress in response to the force required to pull tailstock 30 to the left. A stop block or home stop 292 is fixedly attached to frame 16 at a selected home stop position to stop the tailstock 30 from moving in a left direction linearly along linear way 18 once tailstock 30 has reached the home stop position. The height of stop block 292 extends higher than the bottom of end base 36 of tailstock 30 to impede the left linear motion of tailstock 30. When tailstock 30 is stopped by stop block 292, the nut mechanism 70 is still driven to the left longitudinally along lead screw 54 by the lead screw drive motor 62 which drives headstock 20 to the left and causes headstock 20 to apply a longitudinal force on washers 268 and 288 to compress springs 262 and 282 against retaining rings 263 and 283. Thus, headstock 20 moves linearly to the left while tailstock 30 is stopped in the selected home stop position.

Referring to FIG. 2, a home sensor switch 294 senses when headstock 20 has reached a preset home position and accordingly shuts off drum drive motor 40 and lead screw drive motor 62. As headstock 20 moves to the left away from tailstock 30, the distance between drive plate portion 24 of headstock 20 and end plate portion 34 of tail stock increases which disengages drum 44 from between the tailstock and the headstock. Thus, home sensor switch 294 operates to shut off the drive motors so that the tailstock stops before the tailstock contacts stop block 292 to prevent the drum 44 from being disengaged prematurely from between the tailstock and the headstock. In the preferred embodiment of image scanner 10, the preset home position is set to shut off drum drive motor 40 and lead screw drive motor 62 to stop tailstock 30 a few $\frac{1}{1000}$ths of an inch to the right of stop block 292.

A processing and control board 300 controls drum drive motor 40 via lines indicated at 302 and controls lead screw drive motor 62 through transmission of signals along lines indicated at 304. A user interface 301 provides an interface between an operator and processing and control board 300. User interface 301 can be implemented in a computer having a display and a keyboard. Thus, once both the lead screw drive motor 62 and drum drive motor 40 have been shut off by home sensor switch 294, processing and control board 300, operating under the control of an operator, energizes lead screw drive motor 62 to pull headstock 20 further away from tailstock 30 to disengage drum 44 from between tailstock 30 and headstock 20. When drum 44 is disengaged, drum 44 rests on the two drum support posts 28 and the two drum support posts 38. Once headstock 20 has been driven to a sufficient distance to the left, processing and control board 300 stops the movement of headstock 20. In this way, drum 44 can be easily removed to replace image 52.

When an operator wants to reinsert drum 44 into the image scanner, the operator simply places the drum on support posts 28 and 38, pushes a "V" groove on drum 44 plate onto a pin on drive shaft 46, and then goes back to user interface 301 and types the appropriate command to move headstock 20 back to the right to seat drum 44 between drive shaft 46 of motor 40 and the tapered receiving portion 48 of tailstock 30. A limit switch or drum in place switch 296 is positioned to detect that drum 44 is properly seated between headstock 20 and tailstock 30. Limit switch 296 operates to control drum drive motor 40 and prevents drive motor 40 from being energized to rotate drum 44 until drum 44 is properly seated.

Thus, as compared to previous designs, the quick release nature of connecting mechanism 80 permits an operator to easily remove and replace drum 44 when a new image needs to be scanned. Because drum drive motor 40 and lead screw drive motor 62 are controlled by processing and control board 300, the operator does not need to spend time at the image scanner itself to unload and load an image onto drum 44. In addition, the complex alignment procedures typically required to insert the drum are no longer needed because the exact positioning of drum 44 is known to be at the home stop position when the scanning process begins.

In addition to controlling the drive motors, processing and control board 300 receives signals from shaft encoder 42 indicating the instantaneous position of the rotation of drum 44 via the lines indicated at 302. Processing and control board 300 also controls motor 212 to control the selection of apertures 158 on aperture wheel 157 through signals provided on lines 306. Processing and control board 300 can identify the distance between apertures to provide further control of motor 212 in the selection of apertures. In this way, when the image scanner is in operation, the operator can control the desired resolution of the digital image from user interface 301 instead of being at the image scanner. In addition, processing and control board 300 provides many other valuable functions. For example, if auto-focus 210 fails to focus receiver lens 150 properly, the processing and control board prompts the operator via user interface 301 to manually focus receiver lens 150 to provide the proper focus.

Image scanner 10, as described above, provides a high resolution and wide dynamic range and can be configured to scan reflective or transmissive image sources. Image scanner 10 is computer controlled by processing and control board 300 and the operator needs to spend little time at the image scanner itself. Instead, the operator can be setting scan parameters at the computer display and keyboard.

Because the headstock and tailstock of image scanner 10 ride on a singular linear way 18, complex alignment procedures required in the manufacturing of a typical rotary image scanner are eliminated. Typically, the tailstock and headstock ride on two rails instead of one linear way which accordingly causes alignment problems in the positioning of the two rails. Therefore, complicated alignment procedures are needed to align the two rails when manufacturing a typical rotary image scanner. Since these alignment procedures are not performed in the manufacturing of image scanner 10, image scanner 10 is much less expense to manufacture than typical rotary image scanners.

In addition, the optical block with its opaque housing 162, allows image scanner 10 to be constructed at a significantly lower price than existing scanners providing the same high resolution and wide dynamic ranges of image scanner 10. Moreover, the quick releasing nature of connecting mechanism 80 and the driving mechanism of lead screw 54 and lead screw drive motor 62 provide further enhancements to the image scanner to provide a cost effective, yet high quality design. Moreover, the easy removal of drum 44 allows images to be scanned by operators of less technical skill and requires less time in the mounting of a new source image.

Although the present invention has been described with reference to preferred embodiments, workers skilled in the art will recognize that changes may be made in form and detail without departing from the spirit and scope of the invention.

What is claimed is:

1. An apparatus for use in positioning a rotary drum having an axis of rotation in an image scanner supported in a frame to position an image source mounted on the rotary drum so that a light source illuminates a selected portion of the image source to enable an analyzing device to analyze the selected portion of the image source, the apparatus comprising:

a way mounted to the frame;

a headstock disposed and arranged to receive and support a first end of the rotary drum;

a tailstock disposed and arranged to receive and support a second end of the rotary drum, the headstock and tailstock being independently mounted on the way for linear movement along the axis of the drum;

drum drive means for rotating the drum about the axis;

headstock drive means for linearly moving the headstock along the axis in first and second opposite directions;

a stop block supported by the frame to impede a linear movement of the tailstock in the second direction at a selected stop position; and connecting means for connecting the headstock to the tailstock to cause the tailstock to move linearly along the axis in response to the movement of the headstock, the connecting means including engagement altering means to permit spacing changes between the tailstock and the headstock when the tailstock is at the selected stop position to permit the headstock to continue to move in the second direction.

2. The apparatus of claim 1 wherein the headstock drive means includes:

a lead screw;

nut means threadably coupled to the lead screw and fixedly attached to the headstock; and lead screw drive means for rotating the lead screw.

3. Apparatus of claim 1 wherein the connecting means includes:

a connecting rod having a first end fixedly mounted to one of the headstock or tailstock; and a spring having a first end supported by the connecting rod and a second end bearing against the other of the headstock or tailstock, the spring reacting against a force applied in the second direction of linear movement of the headstock when the tailstock is at the selected stop position to permit continued movement of the headstock in the second direction.

4. The apparatus of claim 1 further comprising:

a home sensing switch for disengaging the drum drive means and the headstock drive means when the headstock reaches a preset stop position.

5. The apparatus of claim 1 further comprising:

an in-place sensing switch indicating that the drum is properly seated between the headstock and the tailstock.

6. The apparatus of claim 1 further comprising:

control means for controlling the drum drive means and the headstock drive means.

7. The apparatus of claim 2 wherein the lead screw drive means comprises a motor.

8. The apparatus of claim 1 wherein the drum drive means comprises a motor.

9. An apparatus for sensing and processing image source signals from an image source mounted on a rotary drum of an image scanner and illuminated by a light source, the apparatus comprising:

a receiver lens for receiving and focusing light representative of the image source;

aperture means for receiving and projecting the light focused by the receiver lens;

an optical block including:

a substantially opaque housing, a condenser lens mounted in a wall of the housing for receiving and projecting light transmitted through the aperture means, light splitting means disposed inside the housing for splitting the light projected by the condenser lens into a plurality of light beams, and a plurality of light filters disposed in the housing for filtering selected portions of the light spectrum from the plurality of light beams; and a plurality of photodetectors corresponding to the plurality of light filters for receiving the plurality of light beams filtered by the light filters, each photodetector providing an output signal level based on the intensity of the incident filtered light beam.

10. The apparatus of claim 9 further comprising:

a rotary wheel having a plurality of apertures circumferentially arranged on the rotary wheel, the wheel being operable to select one of the plurality of apertures through which light is received and projected.

11. The apparatus of claim 10 further comprising control means for controlling the rotary wheel to automatically select a desired aperture.

12. The apparatus of claim 11 wherein the control means identifies the distance between apertures to select a desired aperture.

13. The apparatus of claim 10 wherein the plurality of apertures are rectangular-shaped apertures.

14. The apparatus of claim 9 wherein the plurality of light filters includes a red filter, a blue filter, and a green filter, and wherein the plurality of photodetectors includes a first photo-multiplier tube for receiving the light filtered by the red filter, a second photo-multiplier tube for receiving the light from the blue filter; and a third photo-multiplier tube for receiving the light from the green filter.

15. The apparatus of claim 9 wherein the light splitting means includes:
- a first light splitter for splitting the light transmitted through the aperture into a first light beam and a second light beam; and
- a second light splitter for splitting the second light beam into a third light beam and a fourth light beam.

16. The apparatus of claim 15 wherein the first light beam comprises substantially red spectral components of light, the third light beam comprises substantially blue spectral components of light, and the fourth light beam comprises substantially green spectral components of light.

17. An image scanner comprising:
- a drum for supporting an image source and having an axis of rotation;
- a light source for illuminating a selected portion of the image source;
- a frame;
- a way mounted to the frame;
- a headstock disposed and arranged to receive and support a first end of the rotary drum;
- a tailstock disposed and arranged to receive and support a second end of the rotary drum, the headstock and tailstock being independently mounted on the way for lineal movement along the axis of the drum;
- drum drive means for rotating the drum about the axis;
- headstock drive means for linearly moving the headstock along the axis in first and second opposite directions;
- a stop block supported by the frame to impede a linear movement of the tailstock in the second direction at a selected stop position;
- connecting means for connecting the headstock to the tailstock to cause the tailstock to move linearly along the axis in response the movement of the headstock, the connecting means including disengaging means to disengage the tailstock from the headstock when the tailstock is at the selected stop position to permit the headstock to continue to move in the second direction;
- a receiver lens for receiving and focusing light provided by the light source representative of the image source;
- aperture means for receiving and projecting the light focused by the receiver lens;
- a condenser lens for receiving and projecting light transmitted through the aperture means;
- light splitting means for splitting the light projected by the condenser lens into a plurality of light beams;
- a plurality of light filters for filtering selecting portions of the light spectrum from the plurality of light beams; and
- a plurality of photo-multiplier tubes corresponding to the plurality of light filters for receiving the plurality of light beams filtered by the light filters, each photo-multiplier tube providing a voltage level based on the intensity of the incident filtered light beam.

18. The apparatus of claim 17 further comprising a substantially opaque housing wherein the condenser lens is mounted in a wall of the housing, the light splitting means is disposed inside the housing, and the plurality of light filters are disposed in at least one wall of the housing.

19. The image scanner claim 17 further comprising:
- a rotary wheel having a plurality of apertures circumferentially arranged on the rotary wheel, the wheel being operable to select one of the plurality of apertures through which light is received and projected.

20. The rotary scanner of claim 17 wherein the plurality of apertures are rectangular-shaped apertures.

21. The apparatus of claim 10 wherein at least some of the plurality of apertures have unequal extents in substantially perpendicular directions.

* * * * *

UNITED STATES PATENT AND TRADEMARK OFFICE
CERTIFICATE OF CORRECTION

PATENT NO. : 5,535,061
DATED : July 9, 1996
INVENTOR(S) : MICHAEL G. JOHNSON, GEORGE L. LEMASA It is certified that error appears in the above-indentified patent and that said Letters Patent is hereby corrected as shown below:

On the Title Page [56] Under References Cited, insert--

| | | | |
|---|---|---|---|
| 4,969,734 | 11/1990 | Kahn et al. | 353/38 |
| 4,613,207 | 9/1986 | Fergason | 353/36 |
| 4,448,504 | 5/1984 | Altman | 353/36 |
| 3,051,041 | 8/1962 | Lehmann | 363/66 |

Col. 1, line 39, delete "increase", insert --increased--

Col. 3, line 49, delete "plum", insert --plan--

Col. 4, line 51, delete "Art", insert --An--

Col. 7, line 9, after "A", delete ","

Signed and Sealed this

Twenty-ninth Day of October 1996

Attest:

BRUCE LEHMAN

*Attesting Officer*  *Commissioner of Patents and Trademarks*